US012451552B1

United States Patent
Couarraze et al.

(10) Patent No.: US 12,451,552 B1
(45) Date of Patent: Oct. 21, 2025

(54) BUTTON CELL SENSOR FOR A MOTOR VEHICLE WHEEL

(71) Applicant: Continental Automotive Technologies GmbH, Hannover (DE)

(72) Inventors: Stéphane Couarraze, Toulouse (FR); Yves Maxch, Pelleport (FR); Jonathan Lefloch, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 19/201,153

(22) Filed: May 7, 2025

(30) Foreign Application Priority Data

May 28, 2024 (FR) ...................................... 2405467

(51) Int. Cl.
*H01M 50/264* (2021.01)
*B60C 23/00* (2006.01)
*H01M 50/244* (2021.01)
*H01M 50/249* (2021.01)
*H01M 50/284* (2021.01)
*H01M 50/298* (2021.01)
*H01M 50/109* (2021.01)

(52) U.S. Cl.
CPC ........... *H01M 50/264* (2021.01); *B60C 23/00* (2013.01); *H01M 50/244* (2021.01); *H01M 50/249* (2021.01); *H01M 50/284* (2021.01); *H01M 50/298* (2021.01); *H01M 50/109* (2021.01); *H01M 2220/20* (2013.01)

(58) Field of Classification Search
CPC ............. H01M 50/264; H01M 50/244; H01M 50/249; H01M 50/284; H01M 50/298; H01M 50/109; H01M 2220/20; B60C 23/00
See application file for complete search history.

(56) References Cited

U.S. PATENT DOCUMENTS

| 2,985,705 | A | * | 5/1961 | Smythe | .................. | G04C 10/00 |
| | | | | | | 968/503 |
| 4,998,888 | A | * | 3/1991 | Link | .................. | H01L 23/49593 |
| | | | | | | 439/73 |
| 6,591,672 | B2 | * | 7/2003 | Chuang | ............... | B60C 23/0494 |
| | | | | | | 73/146.8 |
| 6,722,916 | B2 | * | 4/2004 | Buccinna | ............... | H01R 12/57 |
| | | | | | | 439/500 |

(Continued)

FOREIGN PATENT DOCUMENTS

| CN | 114641881 A | 6/2022 |
| FR | 2910843 A1 | 7/2008 |

(Continued)

OTHER PUBLICATIONS

French Search Report with English translation issued in corresponding Patent Application No. FR 2405467 dated Dec. 9, 2024, 20 pages.

*Primary Examiner* — Michael L Dignan
(74) *Attorney, Agent, or Firm* — Buchanan Ingersoll & Rooney PC

(57) ABSTRACT

A sensor for a wheel of a motor vehicle. The sensor being configured to be mounted on the rim of the wheel through a valve orifice and includes an electrically conductive curved wire spring mounted in the lower part of the casing of the sensor and configured to hold a button cell in the lower part of the casing.

11 Claims, 5 Drawing Sheets

(56) References Cited

U.S. PATENT DOCUMENTS

| | | | | |
|---|---|---|---|---|
| 2001/0002346 A1* | 5/2001 | Kodaira | ............... | H01M 50/216 |
| | | | | 439/500 |
| 2014/0232348 A1* | 8/2014 | Szoke | ................. | H01M 50/202 |
| | | | | 429/100 |
| 2014/0363716 A1* | 12/2014 | Nishida | ............... | H01M 50/244 |
| | | | | 429/96 |
| 2016/0133893 A1* | 5/2016 | Chong | ................ | H01M 50/216 |
| | | | | 429/100 |
| 2022/0192025 A1* | 6/2022 | Treml | ................. | H01M 50/244 |
| 2023/0163432 A1 | 5/2023 | Wang | | |
| 2023/0170593 A1 | 6/2023 | Ko et al. | | |
| 2024/0128554 A1 | 4/2024 | Jung et al. | | |
| 2024/0356169 A1* | 10/2024 | Furukawa | ......... | H01M 10/4235 |

FOREIGN PATENT DOCUMENTS

| | | |
|---|---|---|
| TW | M575771 U | 3/2019 |
| WO | 2006132718 A1 | 12/2006 |
| WO | 2023063798 A1 | 4/2023 |

\* cited by examiner

BUTTON CELL SENSOR FOR A MOTOR VEHICLE WHEEL

CROSS REFERENCE TO RELATED APPLICATIONS

This application claims priority to French Application No. 2405467, filed May 28, 2024, the contents of such application being incorporated by reference herein.

FIELD OF THE INVENTION

The present invention relates to the field of motor vehicles and more particularly relates to a button cell sensor, in particular for a motor vehicle wheel, and to a method for mounting such a sensor.

BACKGROUND OF THE INVENTION

Nowadays, it is common to mount a wheel sensor in each wheel of a motor vehicle in order to measure the temperature and pressure of the air contained in said wheel.

There are two main types of wheel sensors: tread sensors and valve sensors.

A tread sensor is adhesively bonded to the inside of the tread of the tire of a wheel while a valve sensor has a valve and is mounted through the valve orifice of the wheel that is formed in the rim.

A valve sensor has, in a known manner, a casing in which is mounted a printed circuit board having electronic components making it possible to measure values of at least one parameter relating to the air contained in said wheel, such as for example the temperature and/or pressure and/or acceleration.

The casing comprises a valve body in the form of a tube designed to be slid into the valve orifice of the wheel in order to fasten the sensor to the rim, for example with the aid of a screw and nut system or else via snap action engagement, the free end of the valve body protruding out of the rim and being closed by a plug.

Still in a known manner, the sensor has a battery for supplying electric power to the components of the printed circuit board. Given that the sensor has to be able to withstand accelerations of several hundred g, it is known in the existing solutions to weld the power supply battery.

However, such welding prevents the battery from being changed when said battery fails, and this complicates the recycling of the battery, and it is then necessary to discard the entire sensor and replace it with a new sensor.

A simple, reliable and effective solution that makes it possible to at least partially remedy these drawbacks would therefore be advantageous.

SUMMARY OF THE INVENTION

To this end, a first subject of the invention is a sensor for a wheel of a motor vehicle, said sensor being configured to be mounted on the rim of said wheel through a valve orifice and comprising:
- a casing having an upper part and a lower part, said upper part having a tubular element configured to be placed in the valve orifice of the rim and to receive the air for inflation of the tire of the wheel,
- a printed circuit board mounted in the upper part of the casing and having electronic components making it possible to measure values of at least one parameter relating to the air contained in said wheel,
- a button cell mounted in the lower part of the casing and configured to supply electric power to said printed circuit board,
- an electrically conductive curved wire spring mounted in the lower part of the casing and configured to hold the button cell in said lower part of the casing, the lower part of the casing having an internal surface from which extend at least one support element, configured to support a first face of the button cell, and first holding members and second holding members of the wire spring,
- the wire spring comprising two branches connected by a central portion and being configured to be positioned in an open position in which the two branches are detached from the second holding members, making it possible to insert the button cell on the at least one support element, and a closed position in which the central portion is fastened to the first holding members and the two branches are fastened to the second holding members and in which a first curved portion of each branch and a curved portion of the central portion of the wire spring bear on the second face of the button cell, which is opposite the first face, and a second curved portion of each branch is in contact with an electrically conductive bearing zone of the printed circuit board so as to conduct the electric current between one of the terminals of the button cell and compress the wire spring when the upper part and the lower part of the casing are assembled with each other and the printed circuit board is placed on the wire spring.

The use of a button cell is a simple, inexpensive, reliable and effective means for supplying power to the wheel sensor. The button cell can be changed when it is discharged. The use of a wire spring to hold the button cell is a simple, reliable and effective means for holding the button cell firmly in place in the casing of the sensor and thus withstanding accelerations of several hundred g.

An obvious solution for a person skilled in the art would have been to use a spiral contact spring to ensure electrical contact with the battery. However, such a spiral spring could move and cause the power supply to the sensor to be cut off when the latter is in operation and subjected to acceleration values of several hundred g.

According to one aspect of the invention, a rechargeable button cell could be used.

Preferably, in the closed position, the two branches are fastened to the second holding members at their free ends.

More preferably, the sensor is configured such that, in the open position, the central portion is fastened to the first holding members.

In one embodiment, the lower part of the casing comprises two first holding members.

Preferably, the first holding members are each in the form of a lug.

In one embodiment, the lower part of the casing comprises two second holding members.

Preferably, the second holding members are each in the form of a lug.

In one embodiment, the lower part of the casing comprises three support elements extending from its internal surface.

Preferably, the sensor comprises a contactor, made of an electrically conductive material, mounted in the lower part of the casing so as to come into contact with the other terminal of the button cell.

An aspect of the invention also relates to a wheel for a motor vehicle, said wheel comprising a sensor as presented above.

An aspect of the invention also relates to a motor vehicle comprising at least one wheel as presented above.

An aspect of the invention also relates to a method for mounting a sensor as presented above, said method comprising the steps of:

separating the lower part and the upper part of the casing, placing the button cell on the at least one support element, placing the central portion of the wire spring on the first holding members, fastening the two branches of the wire spring to the second holding members such that a first curved portion of each branch and a curved portion of the central portion of the wire spring bear on the second face of the button cell, which is opposite the first face, and a second curved portion of each branch is in contact with an electrically conductive bearing zone of the printed circuit board so as to conduct the electric current between one of the terminals of the button cell and compress the wire spring when the upper part and the lower part of the casing are assembled with each other and the printed circuit board is placed on the wire spring.

An aspect of the invention also relates to a method for removing a sensor as described above, said method comprising the steps of:

separating the lower part and the upper part of the casing, removing the two branches of the wire spring from the second holding members so as to place the wire spring in the open, released position, removing the button cell from the at least one support element.

BRIEF DESCRIPTION OF THE DRAWINGS

Further features and advantages of aspects of the invention will become more clearly apparent upon reading the following description. This description is purely illustrative and should be read with reference to the appended drawings, in which.

DETAILED DESCRIPTION OF THE EXEMPLARY EMBODIMENTS

The figure illustrates an example of a motor vehicle 1 according to an aspect of the invention.

The vehicle 1 comprises four wheels 5 each having a sensor 10 according to an aspect of the invention.

Figure 1:
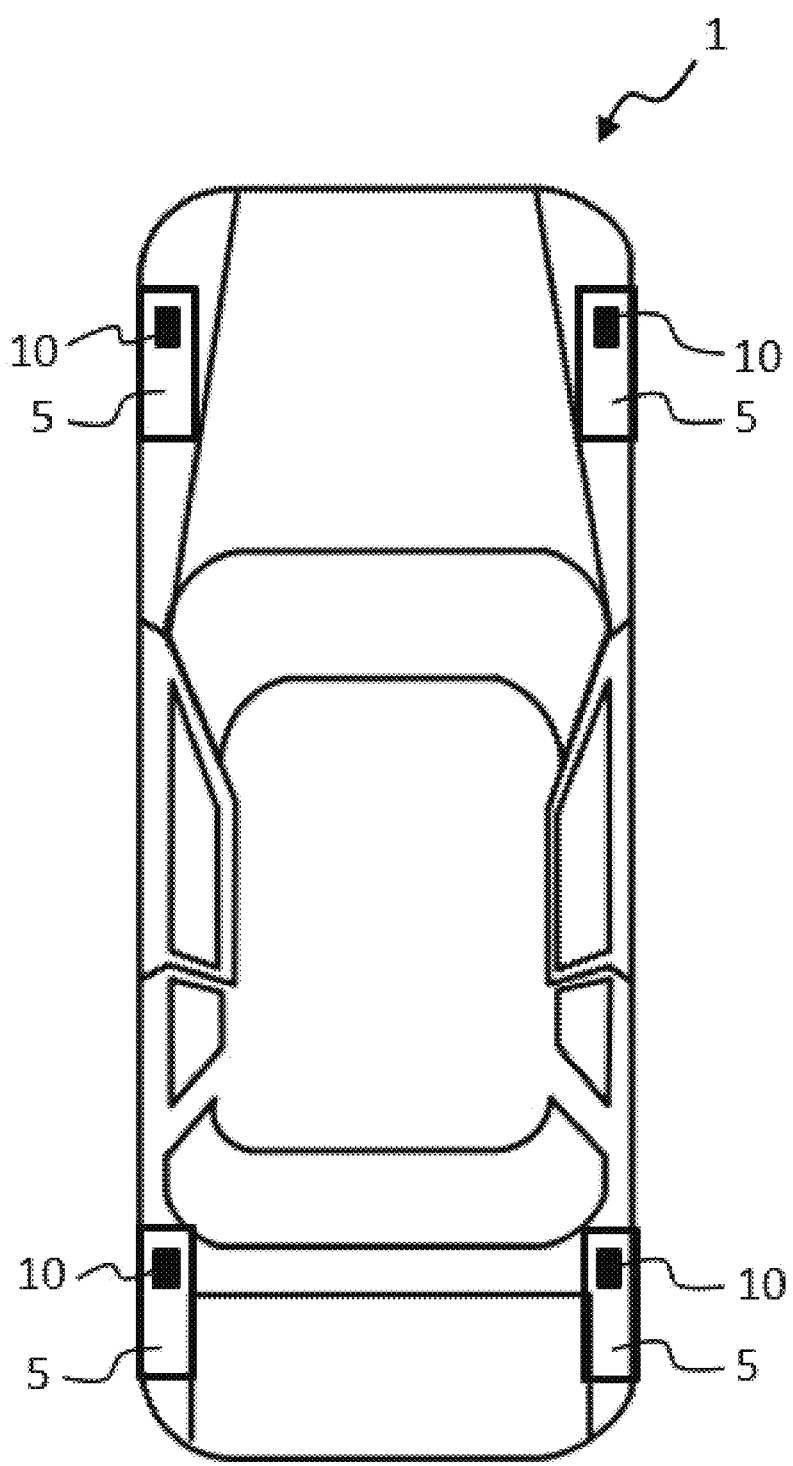
FIG. 1 schematically illustrates an embodiment of the vehicle according to the invention.
Figure 2:
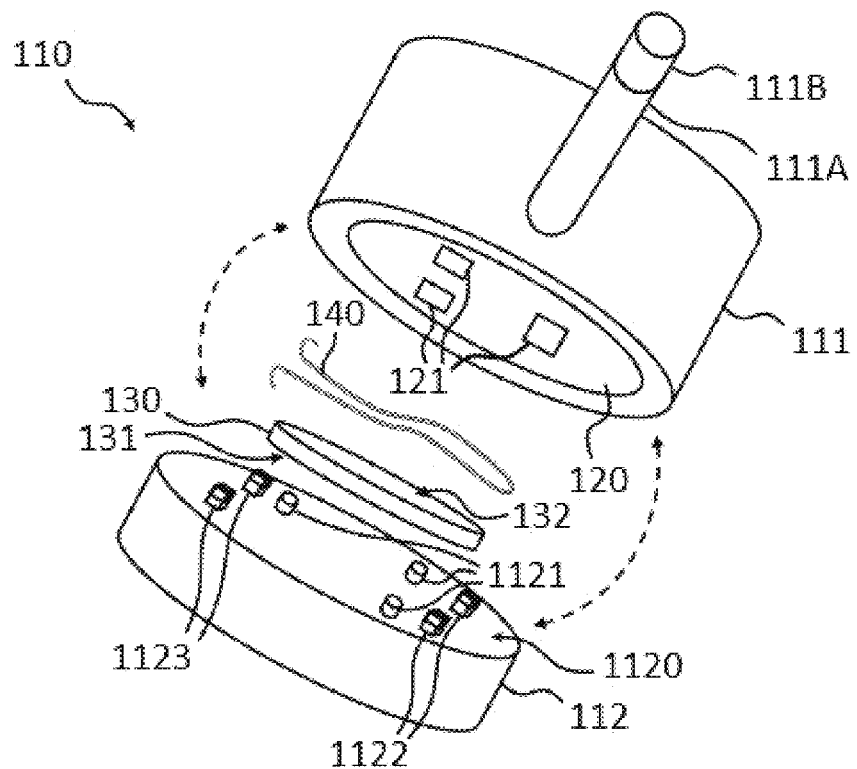
FIG. 2 is a partially exploded view of the lower and upper casings of a form of the sensor according to an aspect of the invention.

With reference to FIG. 2, the sensor 10 comprises a casing 110, a printed circuit board 120, a button cell 130 and a wire spring 140.

The casing 110 has an upper part 111 and a lower part 112.

Figure 3:
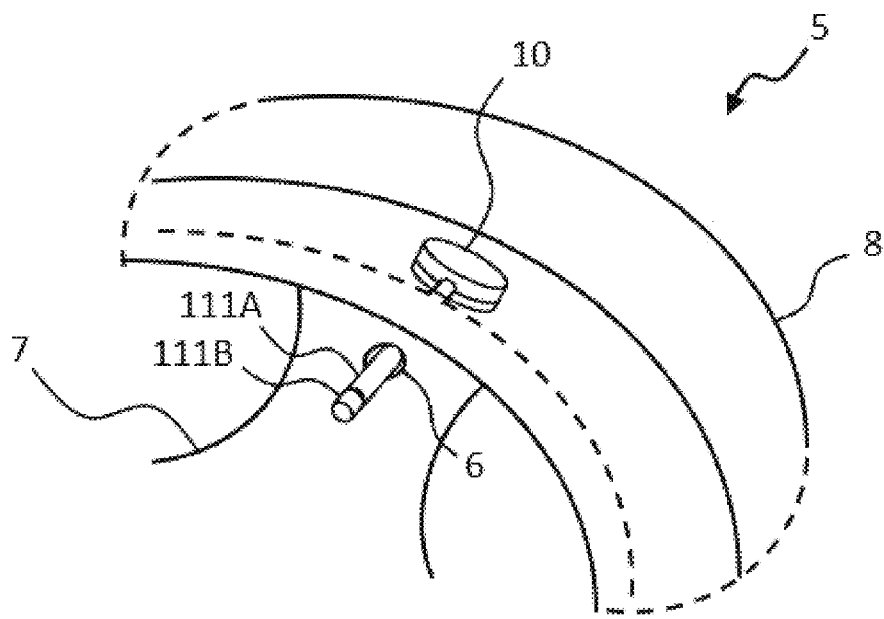
FIG. 3 schematically illustrates the sensor in FIG. 2 mounted on a rim of a motor vehicle wheel.

The upper part 111 comprises a tubular element 111A placed, as illustrated in FIG. 3, in the valve orifice 6 of the rim 7 and making it possible to receive the air for inflation of the tire 8 of the wheel 5. The tubular element 111A is closed by a plug 111B, in a manner known per se.

With reference to FIG. 2, the printed circuit board 120 is mounted in the upper part 111 of the casing 110 and has electronic components (not visible) making it possible to measure values of at least one parameter relating to the air contained in the wheel 5, such as for example the temperature and/or pressure.

Figure 4:
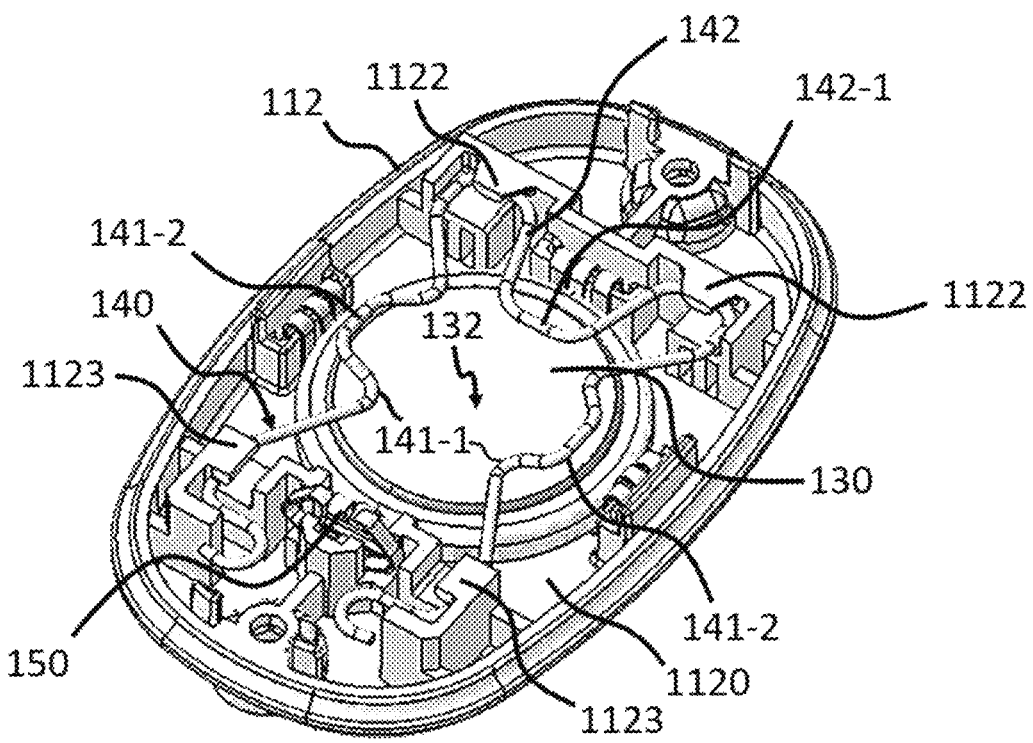
FIG. 4 is a transparent schematic view of the lower part of the casing of an embodiment of a sensor according to the invention in which a button cell is mounted and held by a wire spring, and of a printed circuit board of an upper casing of said sensor that is positioned on said wire spring.
Figure 5:
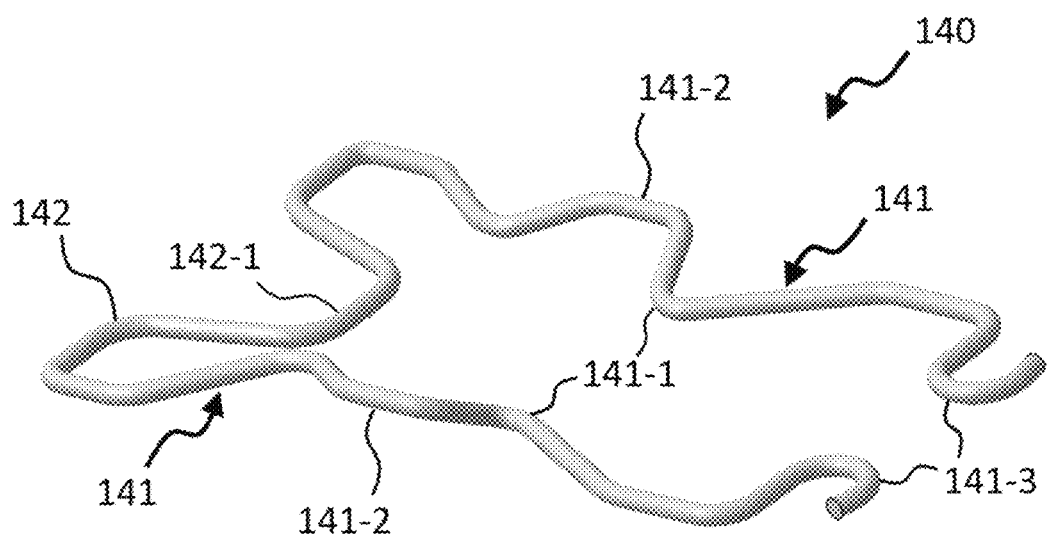
FIG. 5 is a three-quarters perspective view of the wire spring in FIG. 4, in the compressed position.

With reference to FIGS. 2 and 4, the printed circuit board 120 comprises three electrically conductive bearing zones 121 intended to receive portions of the wire spring 140 in order to allow the electronic components to be supplied with electric power by the button cell 130.

The button cell 130 is mounted in the lower part 112 of the casing 110 and makes it possible to supply electric power to the printed circuit board 120. To this end, the button cell 130 has, in a manner known per se, a first face 131 associated with a positive electrical terminal and a second face 132, which is opposite the first face and associated with a negative electrical terminal.

The wire spring 140 is curved and electrically conductive. The wire spring 140 is mounted in the lower part 112 of the casing 110 and makes it possible to hold the button cell 130 in said lower part 112 of the casing 110 and against the printed circuit board 120.

Still with reference to FIGS. 2 and 4, the lower part 112 of the casing 110 comprises an internal surface 1120 from which extend three support elements 1121, first holding members 1122 and second holding members 1123.

Each support element 1121 is configured to support the first face 131 of the button cell 130.

In this example, the first holding members 1122 are in the form of two lugs and the second holding members 1123 are also in the form of two lugs.

The wire spring 140 comprises two branches 141 connected by a central portion 142.

Each branch 141 comprises a first curved portion 141-1, a second curved portion 141-2 and two folded-back free ends 141-3.

The central portion 142 comprises a curved portion 142-1 in contact with the second face 132 of the button cell 130.

Figure 6:
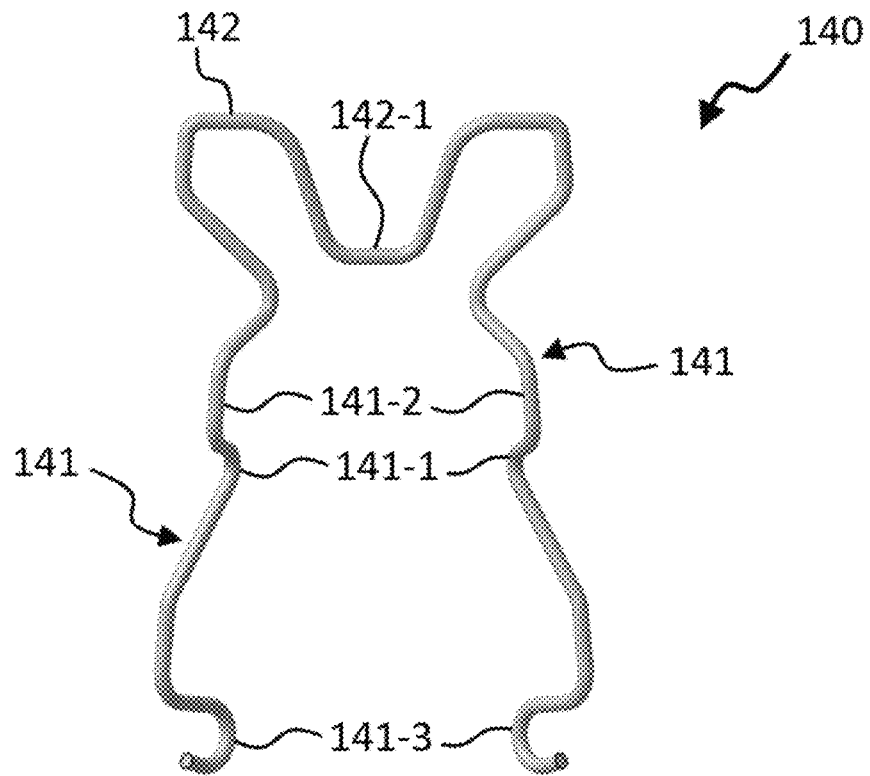
FIG. 6 is a perspective view from above of the wire spring in FIG. 4, in the relaxed position.
Figure 7:
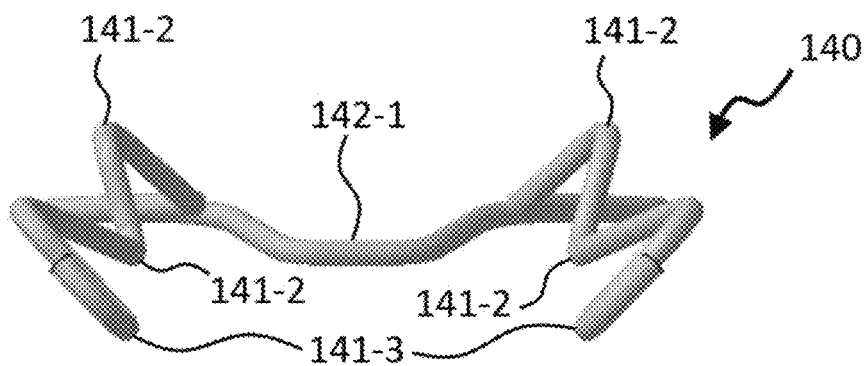
FIG. 7 is a perspective view from the front of the wire spring in FIG. 4, in the relaxed position.
Figure 8:
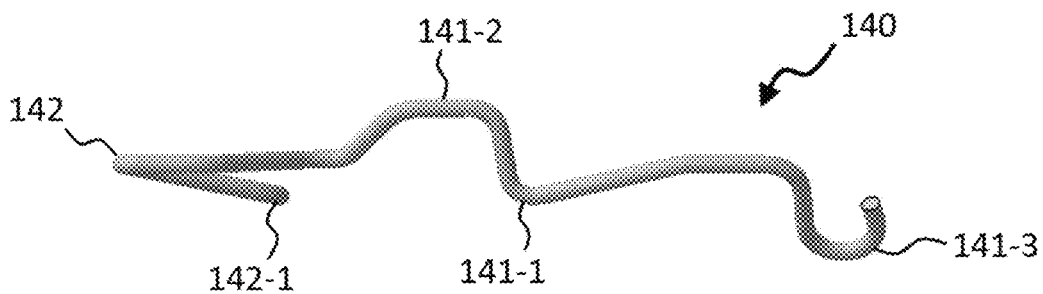
FIG. 8 is a perspective view from the side of the wire spring in the FIG. 4, in the relaxed position.
Figure 9:
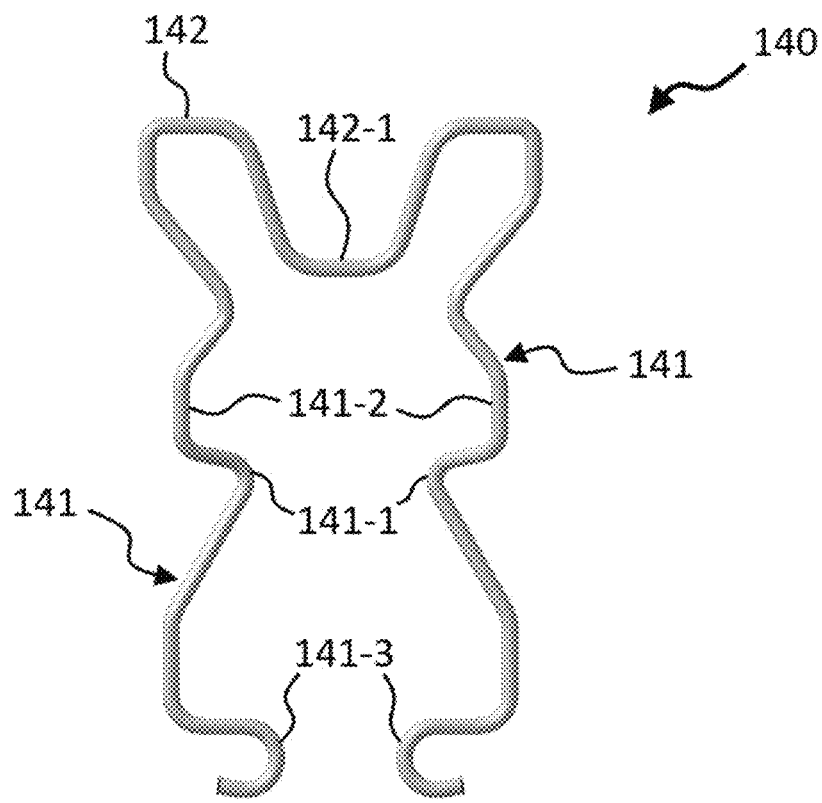
FIG. 9 is a perspective view from above of the wire spring in FIG. 4, in the compressed position.
Figure 10:
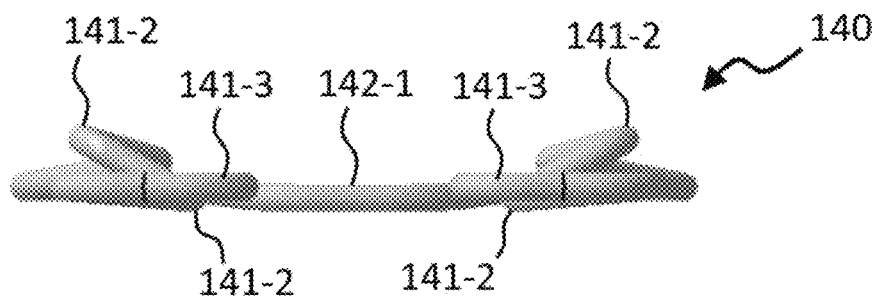
FIG. 10 is a perspective view from the front of the wire spring in FIG. 4, in the compressed position.
Figure 11:
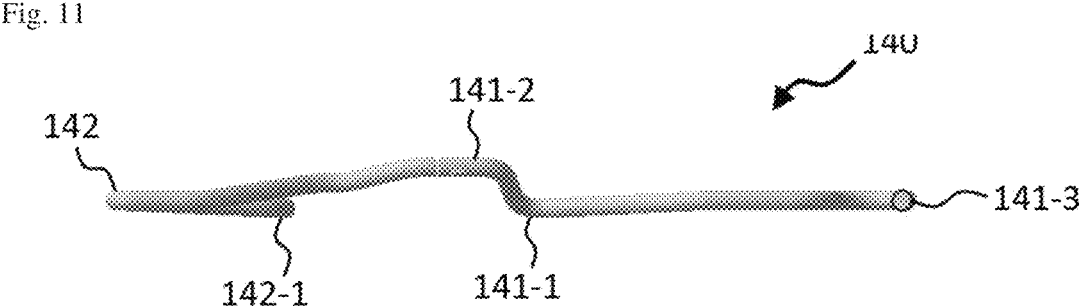
FIG. 11 is a perspective view from the side of the wire spring in FIG. 4, in the compressed position.

The wire spring 140 is configured to switch between an open position and a closed position. In the open position, the spring is relaxed as illustrated in FIGS. 6 to 8. In the closed position, the spring is compressed as illustrated in FIGS. 9 to 11.

In the open position, the central portion 142 is fastened to the first holding members 1122 and the two branches 141 are raised, allowing the first face 131 of the button cell 130 to be placed on the support elements 1121.

In the closed, holding position, the central portion 142 is fastened to the first holding members 1122, the two branches 141 are fastened to the second holding members 1123, the first curved portion 141-1 of each branch 141 and the curved portion 142-1 of the central portion 142 bear on the second face 132 of the button cell 130 and the second curved portion 141-2 of each branch 141 is in contact with one of the electrically conductive bearing zones 121 of the printed circuit board 120 so as to conduct the electric current with the negative terminal of the button cell 130 and compress the wire spring 140 when the upper part 111 and the lower part 112 of the casing 110 are assembled with each other and the printed circuit board 120 is placed on the wire spring 140.

The sensor 10 comprises a contactor 150, made of an electrically conductive material, mounted in the lower part 112 of the casing 110 so as to come into contact with the positive terminal of the button cell 130.

First of all, the lower part 112 of the casing 110 being separated from the upper part 111 of the casing 110 and the central portion 142 of the wire spring 140 being fastened to the first holding members 1122, the wire spring 140 is placed in its open position and the button cell 130 is placed on the support elements 1121.

Next, the two branches 141 of the wire spring 140 are folded down and then fastened to the second holding members 1123 such that the first curved portion 141-1 of each branch 141 and the curved portion 142-1 of the central portion 142 of the wire spring 140 bear on the second face 132 of the button cell 130, and the second curved portion 141-2 of each branch 141 is in contact with the corresponding bearing zone 121 of the printed circuit board 120 so as to conduct the electric current between one of the terminals of the button cell 130 and compress the wire spring 140 when the upper part 111 and the lower part 112 of the casing 110 are assembled with each other and the printed circuit board 120 is placed on the wire spring 140.

During the removal of the sensor, in order to change the button cell 130, the lower part 112 of the casing 110 is separated from the upper part 111 of the casing 110 and the two branches 141 of the wire spring 140 are removed (or released) from the second holding members 1123 so as to place the wire spring 140 in the open position.

The central portion 142 of the wire spring 140 can remain fastened to the first holding members 1122 when the wire spring 140 is placed in its open position.

The button cell 130 is then removed from the support elements 1121 and from the lower part 112 of the casing 110 and replaced if necessary.

The invention therefore makes it possible to remove an electric power supply battery in a wheel sensor in a simple, fast, effective, reliable and removable manner.

The invention claimed is:

1. A sensor for a wheel of a motor vehicle, said sensor being configured to be mounted on the rim of said wheel through a valve orifice and comprising:
    a casing having an upper part and a lower part, said upper part-having a tubular element configured to be placed in the valve orifice of the rim and to receive the air for inflation of the tire of the wheel,
    a printed circuit board mounted in the upper part of the casing and having electronic components making it possible to measure values of at least one parameter relating to the air contained in said wheel,
    a button cell mounted in the lower part of the casing and configured to supply electric power to said printed circuit board,
    an electrically conductive curved wire spring mounted in the lower part of the casing and configured to hold the button cell in said lower part of the casing,
    the lower part of the casing-having an internal surface from which extend at least one support element, configured to support a first face of the button cell, and first holding members and second holding members of the wire spring, the wire spring comprising two branches connected by a central portion and being configured to be positioned in an open position in which the two branches are Buchanan detached from the second holding members, making it possible to insert the button cell on the at least one support element, and a closed position in which the central portion is fastened to the first holding members and the two branches are fastened to the second holding members and in which a first curved portion of each branch and a curved portion of the central portion of the wire spring-bear on the second face of the button cell, which is opposite the first face, and a second curved portion of each branch is in contact with an electrically conductive bearing zone of the printed circuit board so as to conduct the electric current between one of the terminals of the button cell and compress the wire spring when the upper part and the lower part of the casing are assembled with each other and the printed circuit board is placed on the wire spring.

2. The sensor as claimed in claim 1, wherein the lower part of the casing comprises two first holding members.

3. The sensor as claimed in claim 1, wherein the first holding members are each in the form of a lug.

4. The sensor as claimed in claim 1, wherein the lower part of the casing comprises two second holding members.

5. The sensor as claimed in claim 1, wherein the second holding members are each in the form of a lug.

6. The sensor as claimed in in claim 1, wherein the lower part of the casing comprises three support elements extending from its internal surface.

7. The sensor as claimed in claim 1, wherein the sensor comprises a contactor, made of an electrically conductive material, mounted in the lower part of the casing so as to come into contact with the other terminal of the button cell.

8. The sensor as claimed in claim 2, wherein the first holding members are each in the form of a lug.

9. A wheel for a motor vehicle, said wheel comprising a sensor as claimed in in claim 1.

10. A motor vehicle comprising at least one wheel as claimed in claim 9.

11. A method for mounting a sensor as claimed in claim 1, said method comprising:
    separating the lower part and the upper part of the casing,
    placing the button cell on the at least one support element,
    placing the central portion of the wire spring on the first holding members,
    fastening the two branches of the wire spring to the second holding members such that a first curved portion of each branch and a curved portion of the central portion of the wire spring bear on the second face of the button cell, which is opposite the first face, and a second curved portion of each branch is in contact with an electrically conductive bearing zone of the printed circuit board so as to conduct the electric current between one of the terminals of the button cell and compress the wire spring when the upper part and the lower part of the casing are assembled with each other and the printed circuit board is placed on the wire spring.

\* \* \* \* \*